April 22, 1952     L. E. FINCH     2,593,549
FRENCH FRYER
Filed April 23, 1949
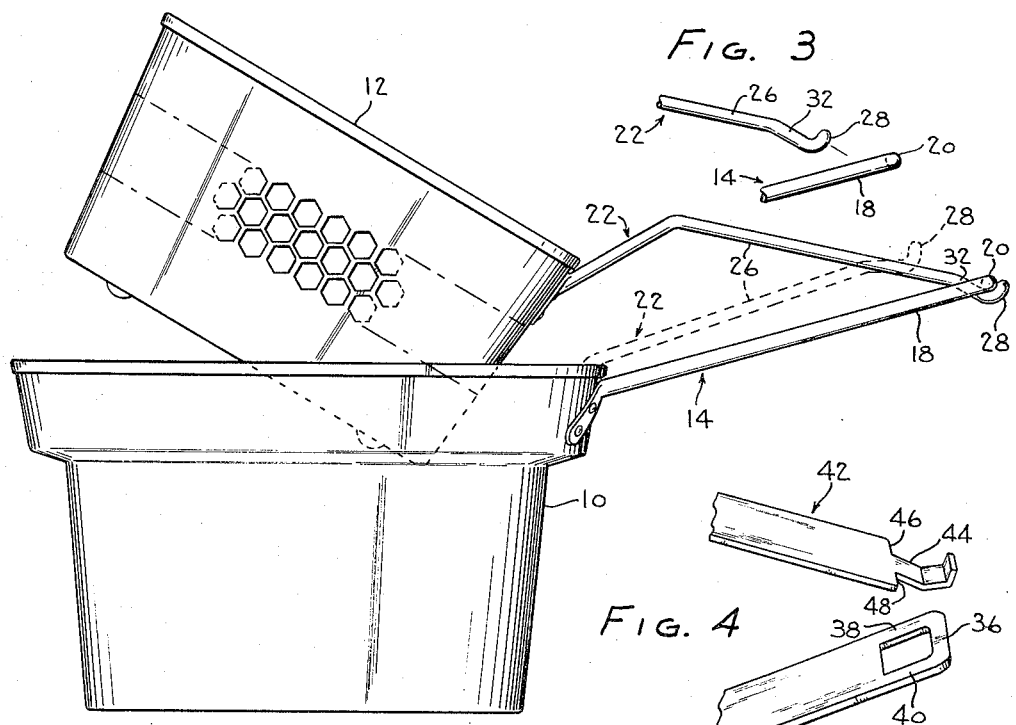
Fig. 3
Fig. 1
Fig. 4
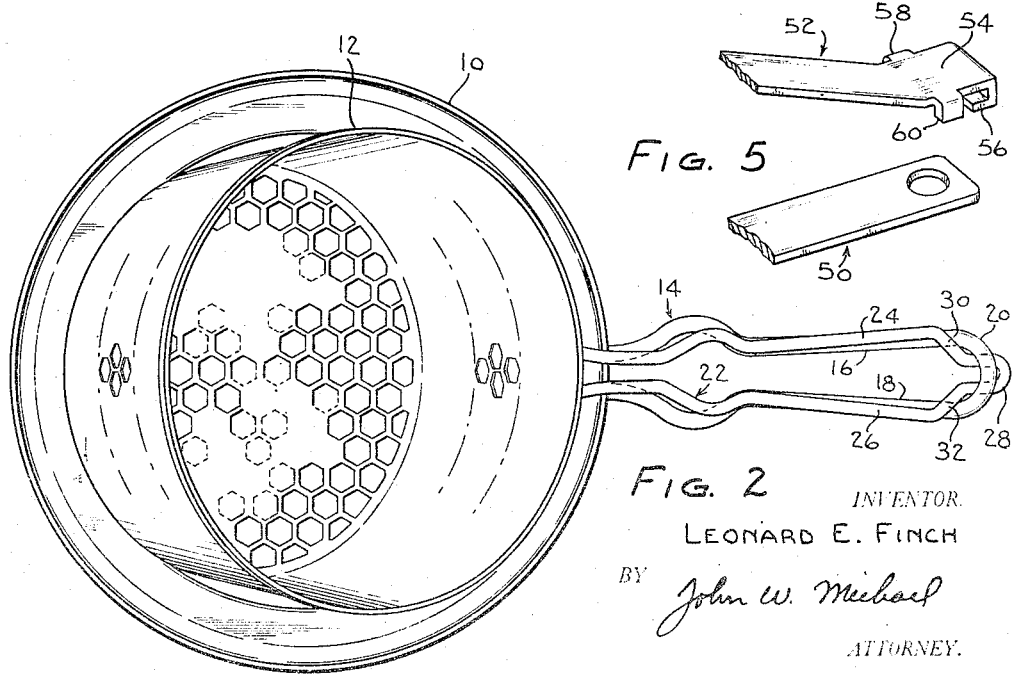
Fig. 5
Fig. 2
INVENTOR.
LEONARD E. FINCH
BY John W. Michael
ATTORNEY.

Patented Apr. 22, 1952

2,593,549

UNITED STATES PATENT OFFICE 2,593,549

FRENCH FRYER

Leonard E. Finch, West Bend, Wis., assignor to West Bend Aluminum Co., West Bend, Wis., a corporation of Wisconsin Application April 23, 1949, Serial No. 89,282

2 Claims. (Cl. 99—411)

This invention relates to improvements in cooking utensils, particularly to the type known as French friers employing a cooking vessel and basket.

In the process of French frying it is necessary to remove the food from the cooking oil and allow the excess oil to drain off into the cooking vessel. If such oil drops outside of or runs down the outer surface of the walls of the cooking vessel it will reach the heating element or hot area around such element and either catch on fire slowly smolder and emit undesirable odors. It is, therefore, desirable to keep the basket within the upwardly extended lateral confines of the vessel while raising the basket from the cooking oil in the vessel and during the time the food is draining. There are devices now on the market for temporarily attaching the basket to the edge of the cooking vessel. With such devices, however, a portion of the basket overhangs the walls of the vessel and some of the cooking oil either drops directly outside the vessel or runs down the outside of its walls.

It is an object of this invention, therefore, to provide means for suspending the basket above the oil in the cooking vessel and within the upward extension of the lateral confines of the vessel.

Another object of the invention is to provide means for so suspending the basket which is of simple construction, economical to manufacture, and simple to use.

These objects are obtained by providing the handles for the basket and the vessel with interlocking portions and an interreacting fulcrum which keep the handles angularly related to hold the basket in the draining position. The interlocking portions are spaced from the respective peripheries of the basket and vessel so that when interlocked the basket will lie within the upward extension of the lateral confines of the vessel.

The novel features, which are considered characteristic of the invention, are set forth with particularity in the appended claims. The invention itself, however, both as to its organization and its method of operation, together with additional objects and advantages thereof, will best be understood from the following descriptions of specific embodiments when read in connection with the accompanying drawing, in which:

Fig. 1 is a view in side elevation of a French frier embodying the present invention with the basket shown in draining position, the handle of the basket when in frying position being shown in broken lines;

Fig. 2 is a view in top plan elevation of the French frier viewed in Fig. 1;

Fig. 3 is a fragmentary view in side elevation showing the position of the handles of the vessel and the basket just prior to the interlocking thereof;

Fig. 4 is a fragmentary view in perspective of a modification of this invention; and Fig. 5 is a fragmentary view in perspective of still another modification of this invention.

Referring to the invention by reference numerals, the cooking utensil comprises a cooking vessel 10 and a basket 12 which nests therein. The general construction of the vessel 10 and the basket 12 are well known and are described and shown in U. S. Letters Patent 1,994,268, issued to Gustav Paul Bartels March 12, 1935. They will not be further described herein. The vessel 10 has a laterally slightly upwardly projecting vessel handle 14 of customary construction. In the principal embodiment the handle is formed of wire and has two spaced legs 16 and 18 joined at their outer ends by a loop 20. Also in the principal embodiment, the basket 12 is provided with a basket handle 22 which is formed of wire having spaced legs 24 and 26 which are joined to a loop-like projection 28 by transverse shoulders 30 and 32. As is shown in Fig. 2, the legs 24 and 26 of the basket handle are spaced sufficiently to cause the shoulders 30 and 32 to aline with and bear against the legs 16 and 18 to form a fulcrum between the handles when the projection 28 is inserted beneath the loop 20.

In order to suspend the basket 12 in the draining position shown in Fig. 1 the projection 28 is inserted beneath the loop 20 and the shoulders 30 and 32 fulcrumed against the legs 16 and 18. This keeps the handles 14 and 22 in the angular relation shown. The projection 28 is preferably bent upward, as shown in Figs. 1 and 3, to form a hook which engages with the loop 20 to prevent relative longitudinal movement of the handles when so positioned. When the basket 12 is nested within the vessel 10 for frying, the handle 22 assumes the angular position shown in the dotted lines of Fig. 1. In this position the projection 28 is spaced slightly inwardly from the loop 20. This compensates for the slight outward movement of the upper rim of the basket 12 relative to the rim of the vessel 10 as the basket is raised and tilted and keeps the basket 12 completely within the upward extension of the lateral confines of the vessel 10. The manipulation of the basket handle 22 to raise the basket and lock the projection 28 under the hook 20 is very simple and requires no special skill. It can be readily accomplished while keeping the basket 12 within the upward extensions of the lateral confines of the vessel 10. In addition to this, the holding device is made by an inexpensive, simple, additional forming step in the customary manufacture of a usual basket handle 22.

In the modification shown in Fig. 4, the vessel handle 34 is made of a strip of metal and an opening is made adjacent the outer end thereof to form a bridge 36 and legs 38 and 40. The basket handle 42 is likewise formed from strip stock and has its ends notched to provide a projection 44 and shoulders 46 and 48. The projection 44 may be bent upwardly to form a hook. The handles so constructed are interlocked in substantially the same manner as those heretofore described. The projection 44 is inserted through the opening and hooked under the bridge 36 while the shoulders 46 and 48 abut against the legs 38 and 40 to form the fulcrum.

In the modification shown in Fig. 5 the vessel handle 50 is made of flat stock and is shaped in accordance with well-known practice. However, the basket handle 52 is formed of flat stock and has at its end a vessel handle-engaging portion 54 bent at an angle to the main body of the handle 52. The outer end of the portion 54 terminates in a downturned hook 56. In assembling the handles of this modification, the hook 56 is inserted under the bottom of the end of vessel handle 50 and the surface 54 rests against the top of the vessel handle to form the fulcrum therebetween. It may be desirable to add to the portion 54, offset tabs 58 and 60 which rest against the sides of the vessel handle 50 to prevent the handles from having relative lateral movement while holding the basket in draining position.

Although only several embodiments of the invention are shown and described herein, it will be understood that this application is intended to cover such other changes or modifications as come within the spirit of the invention or scope of the following claims.

I claim:

1. In a French frier having a cooking vessel with a vessel handle and a basket with a basket handle, said handles extending radially outward of said vessel and basket a sufficient distance to provide space for manually grasping said handles between the outer ends thereof and said vessel and basket, and opening within the confines of said vessel handle adjacent the end thereof, a projection and shoulder integrally formed on the end of said basket handle, said projection with said basket in elevated position over said vessel being tilted with repect to said opening and inserted in said opening and engaging the periphery thereof and said shoulder bearing on said vessel handle whereby said handles are supported in required relative angular relationship to hold said basket in said elevated position, and a hook on said projection for preventing relative sliding movement between said handles while said basket is in elevated position.

2. In a French frier having a cooking vessel and a removable inner basket which in the draining position thereof is above the cooking level and centered over said vessel so as to be within the upward extensions of the lateral confines of said vessel, a vessel handle formed of wire having spaced legs joined by a loop at the end of said handle, said loop being spaced outwardly of said vessel a sufficient distance to provide space for manually grasping said handle between said loop and said vessel, and a basket handle having a pair of shoulders and a hooked projection adjacent said shoulders, said shoulders and projection being spaced outwardly of said basket a sufficient distance to provide space for manually grasping said handle between said shoulders and projection and said basket, said hook being engaged with said loop and said shoulders being engaged with said legs to hold said basket in said draining position.

LEONARD E. FINCH.

REFERENCES CITED

The following references are of record in the file of this patent:

UNITED STATES PATENTS

| Number | Name | Date |
|---|---|---|
| 372,380 | Morris | Nov. 1, 1887 |
| 557,126 | Hodges et al. | Mar. 31, 1896 |
| 656,909 | Taylor | Aug. 28, 1900 |
| 713,575 | Von Uffel | Nov. 11, 1902 |
| 1,580,582 | Carman | Apr. 13, 1926 |

FOREIGN PATENTS

| Number | Country | Date |
|---|---|---|
| 157,623 | Switzerland | Oct. 15, 1932 |
| 208,356 | Great Britain | Dec. 20, 1923 |